May 11, 1926.

A. ZOUVELOS 1,584,066

FRUIT JUICE EXTRACTOR

Filed August 1, 1925    2 Sheets-Sheet 2

Inventor
Andrew Zouvelos
By Owen Owen & Crampton
Attorney

Patented May 11, 1926.

1,584,066

UNITED STATES PATENT OFFICE.

ANDREW ZOUVELOS, OF TOLEDO, OHIO.

FRUIT-JUICE EXTRACTOR.

Application filed August 1, 1925. Serial No. 47,433.

My invention has for its object to provide an efficient and convenient beverage extractor and mixer that may be entirely enclosed to keep out flies, gnats, etc., and is so constructed that it may be thoroughly cleansed and maintained in a sanitary condition. Specific constructions containing my invention utilizes a set of motor driven paddles or bars located in a receptacle and a fruit juice extractor located in a removable shell that forms a cover to the container, the shell also being provided with an enclosing cover. The shell is so formed as to produce a passage way between the shell and the wall of the container for the insertion of cracked ice into the container, the passage way being partitioned or closed from the fruit juice extracting chamber of the shell to prevent the pulp and seeds from entering through the passage way into the container.

The invention may be contained in fruit juice extractors and beverage mixers of different forms and to illustrate a practical application of the invention and describe its operation, I have selected a structure containing the invention as an example of such devices and shall describe it hereinafter. The structure selected is shown in the accompanying drawings.

Figure 1:
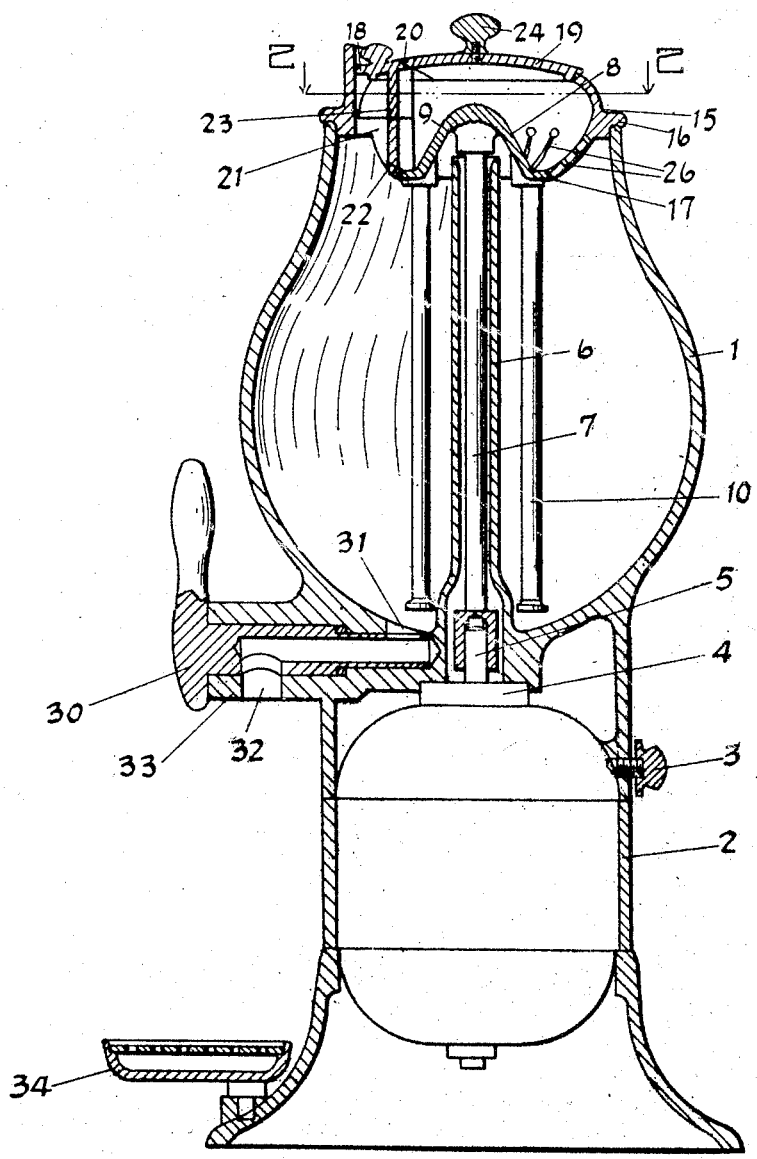
Figure 2:
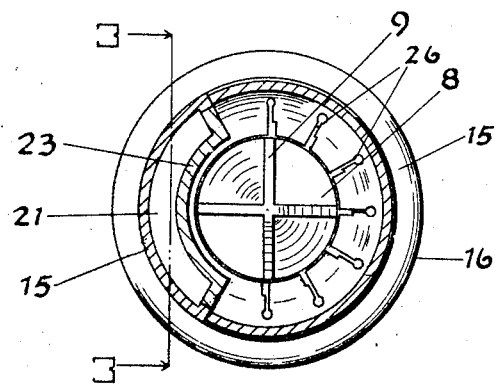
Figure 4:
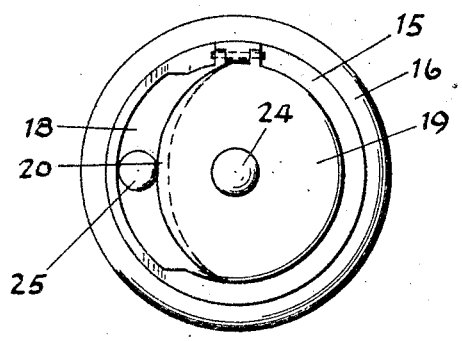
Figure 3:
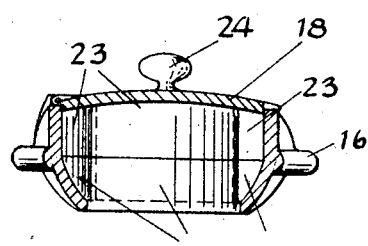

Figure 1 of the drawings is a vertical sectional view of a fruit juice extractor and mixer containing my invention. Fig. 2 is a view of a section taken on the plane of the line 2—2 indicated in Fig. 1. Fig. 3 is a view of a section taken on the plane of the line 3—3 indicated in Fig. 2. Fig. 4 is a top view of the shell in which the juice of the fruit is extracted.

In the construction shown in the drawings the liquids that are used to form the beverage are inserted in a container 1. The container 1 may be of any suitable shape to make the device attractive in appearance. It is, however, preferably substantially urn or ovoid shape, and stirring paddles or rods extend to the bottom of the container to produce agitation of all parts of the liquid that may be inserted in the container. The container 1 may be secured to a base 2 by means of thumb screws 3. The base 2 is provided with a small electric motor 4 having a shaft 5. The container 1 is provided with a sleeve 6 in which a spindle 7 is located. The spindle 7 may be connected to the shaft 5 and a fruit juice extractor 8 may be connected to the spindle 7. The sleeve 6 prevents the liquid from passing through the container 1 and yet permits a connection between the fruit juice extractor 8 and the shaft 5 of the motor 4.

The extractor 8 is provided with ridges 9 of the type commonly used for breaking the pulp and allowing the juice to flow from the fruit and is particularly adapted for extracting the juice from lemons, oranges and like fruit, when rotated. Since the extractor 8 is connected to the motor 5 the juice is quickly removed from the fruit by pressure of the fruit against the extractor. Paddles or bars 10 extend down into the container 1 to near the bottom so as to agitate the contents of the container when the extractor 8 is rotated. Preferably, the bars or paddles 10 are connected to the extractor 8 and are removably connected to the spindle 7. When, therefore, it is desired to clean the device the extractor and paddles may be removed as a unit.

The extractor 8 is, preferably, located in a shell 15 having a flange portion 16 that fits over the top of the container 1. The extractor 8 substantially fits an opening 17 formed in the bottom of the shell 15 and yet so as to be freely rotatable within the opening. The shell 15 is closed by a double cover having the cover parts 18 and 19 that have overlapping edge portions 20. The shell 15 has a passage way 21 that is formed by a partitioning wall 22 that is made integral with the shell 15 and a downwardly extending flange 23 that rests on the edge of the wall 22, the flange 23 being formed integral with the cover part 18. The passage way 21, however, is closed by the cover part 18. The cover parts are provided with knobs 24 and 25 whereby the parts may be opened. The edges 20 overlap in such a manner that the cover part 19 cannot be closed until the part 18 is closed and when the cover part 18 is open it will also open the cover part 19. When making up a beverage cracked ice may be inserted through the passage way 21 into the container 1 and then the cover part 18 may be closed to completely close the passage way 21 although the cover part 19 may be open. Fruit juices or other liquids may also, if desired, be inserted through the passage way 21 before the cover part 18 is closed. While the cover part 19 is still open fruit juices may be extracted from the fruit by pressing it against the extractor 8 while the extractor is being rotated. It will pass through suitable openings 26 formed in the bottom of the shell. While the extractor 8 is thus being rotated the paddles 10 will agitate the liquids in the container 1 together with the cracked ice that may be inserted therein and produce a very appetizing and tasteful drink.

The liquid may be drawn from the container through a suitable faucet or cock 30 that controls the openings 31 and 32 formed in the bottom of the container 1, a depending flange or supporting part of the container and a protruding boss or nipple 33. A suitable stand 34 for a glass, or other receptacle, may be located below the cock 30 for receiving the liquid from the container.

I claim:

1. In a fruit juice extractor and beverage mixer, a container, a shell for closing the container, a fruit juice extractor located in the shell, the shell having a passage way for directing bulky materials through the shell into the container and openings for permitting the fruit juices to pass from the shell into the container, means for rotating the fruit juice extractor.

2. In a fruit juice extractor and beverage mixer, a container, a shell for closing the container, a fruit juice extractor located in the shell, the shell having a passage way for directing bulky materials through the shell into the container and openings for permitting the fruit juices to pass from the shell into the container, means for rotating the fruit juice extractor, a double cover having a cover part for closing the passage way and a cover part for closing the shell.

3. In a fruit juice extractor and beverage mixer, a container, a shell for closing the container, a fruit juice extractor located in the shell, the shell having a passage way for directing bulky materials through the shell into the container and openings for permitting the fruit juices to pass from the shell into the container, means for rotating the fruit juice extractor, a double cover having a cover part for closing the passage way and a cover part for closing the shell.

In testimony whereof I have hereunto signed my name to this specification.

ANDREW ZOUVELOS.